US005487708A

United States Patent [19]
Marusue

[11] Patent Number: 5,487,708
[45] Date of Patent: Jan. 30, 1996

[54] AUTOMATIC TRANSMISSION CONTROL SYSTEM FOR AUTOMOBILES

[75] Inventor: Toshihisa Marusue, Hiroshima, Japan

[73] Assignee: Mazda Motor Corporation, Hiroshima, Japan

[21] Appl. No.: 290,637

[22] Filed: Aug. 16, 1994

[30] Foreign Application Priority Data

Aug. 17, 1993 [JP] Japan ..................... 5-203433

[51] Int. Cl.$^6$ ................................ F16H 61/00
[52] U.S. Cl. ........................................ 475/116
[58] Field of Search ..................... 475/116, 119, 475/121; 477/125

[56] References Cited

U.S. PATENT DOCUMENTS 5,109,731  5/1992  Iwatsuki et al. ................. 477/125

FOREIGN PATENT DOCUMENTS 63-186055  8/1988  Japan .

*Primary Examiner*—Dirk Wright
*Attorney, Agent, or Firm*—Keck, Mahin & Cate

[57] ABSTRACT

An automatic transmission control system has a plurality of frictional coupling elements within an automatic transmission which are selectively locked and unlocked in a particular way to place the automatic transmission into any desired gear in various ranges. Two specific frictional coupling elements, such as a low/reverse brake and a 3/4 clutch, may potentially cause mechanical locking of the automatic transmission when they are locked simultaneously. The automatic transmission control system, however, includes a first valve for connecting and disconnecting a supply of hydraulic pressure to the low/reverse frictional coupling element to lock and unlock the low/reverse frictional coupling element in low speed and reverse ranges, and a second valve for connecting and disconnecting a supply of hydraulic pressure to the 3/4 frictional coupling element to lock and unlock the 3/4 frictional coupling element. The first and second valves are disposed in series between a hydraulic pressure source and the low/reverse frictional coupling element and cooperate with each other so as to connect supply of hydraulic pressure alternatively to the low/reverse frictional coupling element and the specific frictional coupling element.

5 Claims, 6 Drawing Sheets

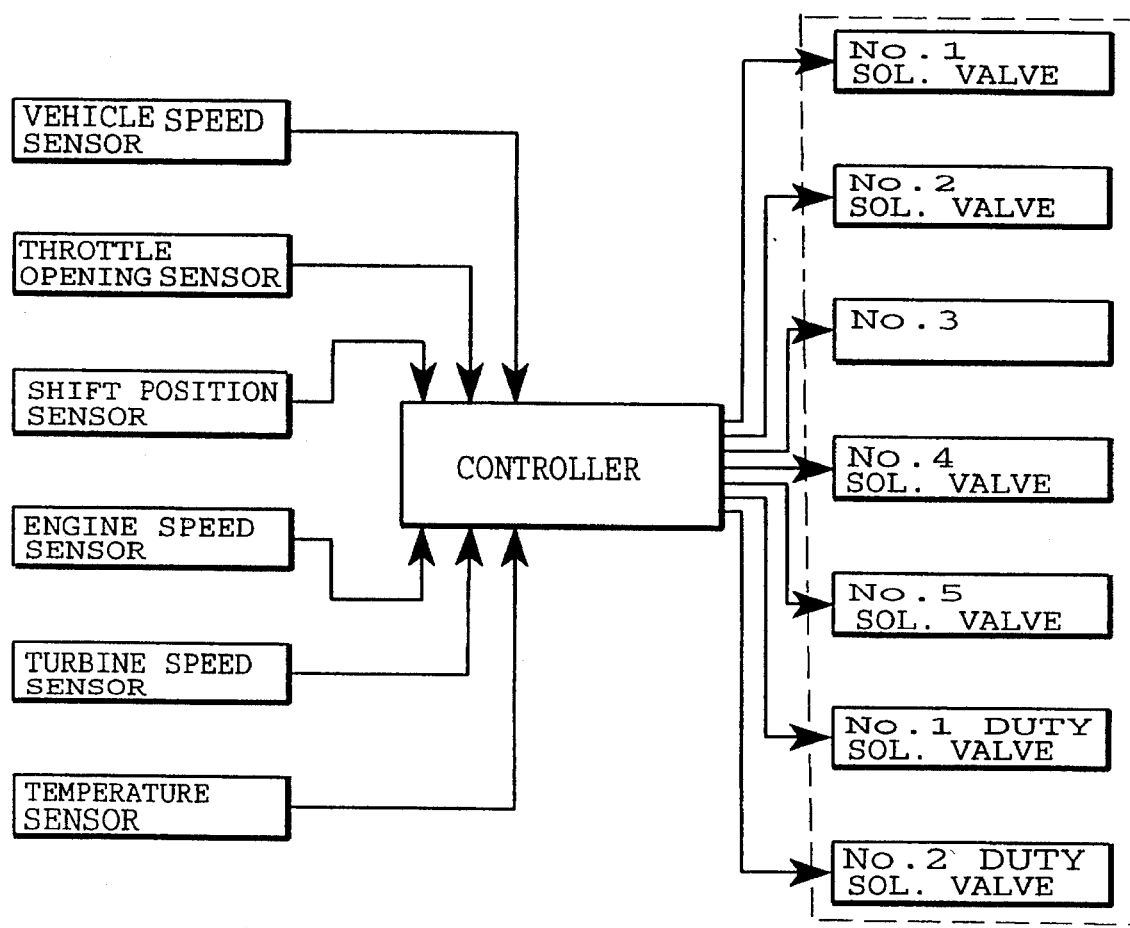

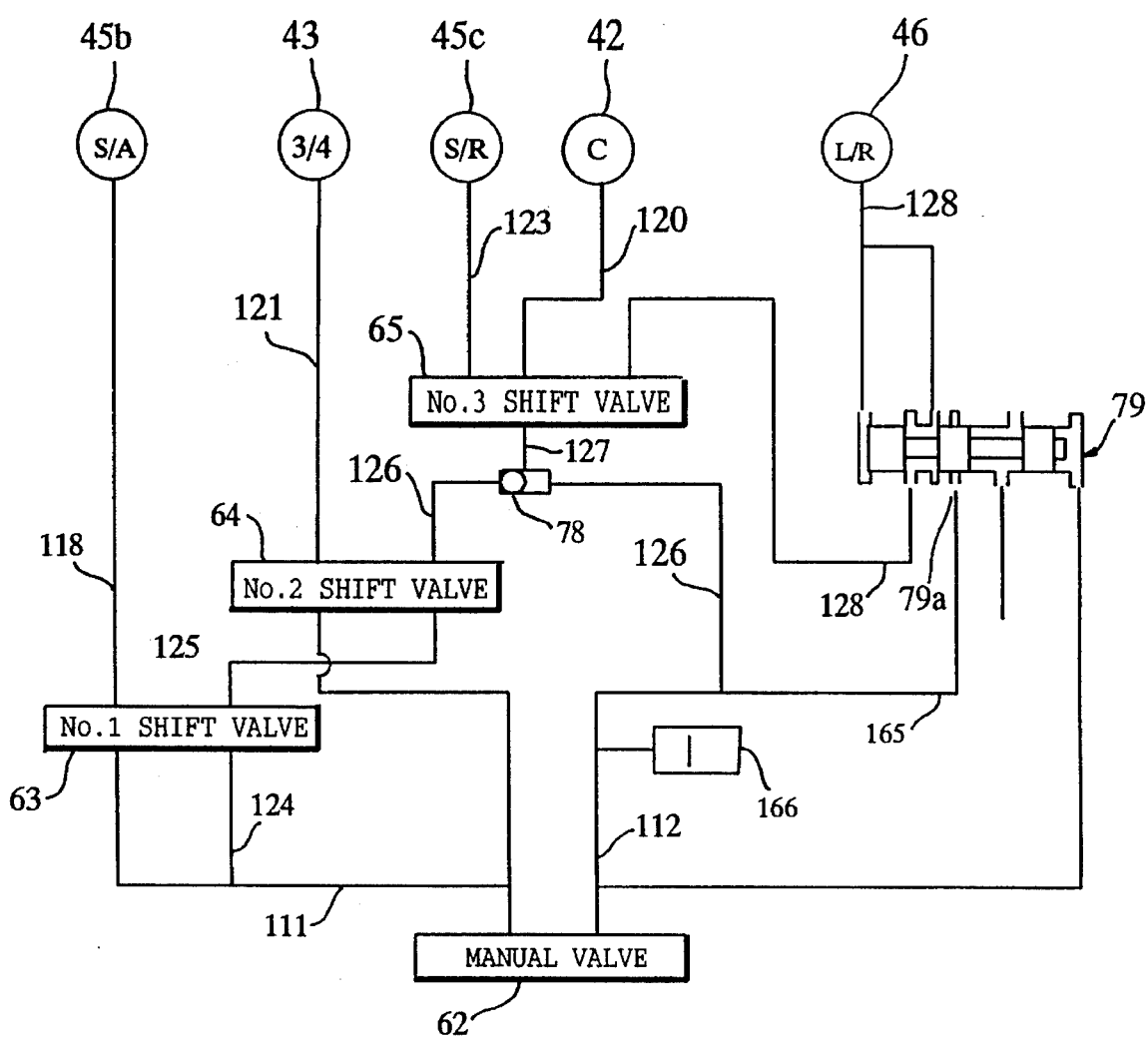

AUTOMATIC TRANSMISSION CONTROL SYSTEM FOR AUTOMOBILES

BACKGROUND OF THE INVENTION

1. Field of the Invention

The present invention relates to a control system for an automatic transmission for automobiles and, more particularly, to an automatic transmission control system for automobiles having a hydraulic circuit which has a low/reverse frictional coupling element locked in a reverse range, by a manual valve, and a low range of an automatic transmission.

2. Description of Related Art

Typically, automatic transmissions for automobiles have various torque converters and transmission gear mechanisms. Each such torque converter and gear mechanism includes a plurality of frictional coupling elements which are selectively locked or coupled and unlocked or released. Such coupling elements may include clutches and brakes and are locked and unlocked so as to place the automatic transmission into desired transmission modes or ranges and gears according to driving conditions. Selectively locking and unlocking of these frictional coupling elements is performed by the use of actuators associated with the respective frictional coupling elements which are controlled by means of a hydraulic control circuit.

Hydraulic control circuits of this kind typically include various hydraulic control valves, such as a line pressure regulator valve, a valve for generating hydraulic pressure corresponding to throttle openings of an engine throttle valve, a manual valve which is operated manually to change from one transmission range to another, a plurality of shift valves for selectively activating the actuators so as to provide any desired gear, and a plurality of solenoid valves for driving the shift valves selectively according to driving conditions. Such a hydraulic control circuit is known from, for instance, Japanese Unexamined Patent Publication No. 63-186,055.

Some automatic transmissions of this type include two frictional coupling elements which correlate with each other such that they cause mechanical locking of the transmission gear mechanism if they are simultaneously locked. For example, if simultaneous locking between a 3/4 clutch, disposed between a turbine shaft of the torque converter and a carrier of the planetary gear forming the transmission gear mechanism, and a low/reverse brake for locking the carrier is caused, the turbine shaft is disabled from turning, causing mechanical locking of the transmission gear mechanism. In order for a conventional automatic transmission to avoid the simultaneous locking of a frictional coupling element and the low/reverse brake corresponding to mechanical locking of the automatic transmission, the low/reverse brake is configured so as to be locked as a result of manual operation of the manual valve.

Because it is necessary for a hydraulic control circuit, which locks the low/reverse valve as a result of manual operation of the manual valve, to be organized so as to deliver hydraulic pressure into various pressure lines through the manual valve, the hydraulic control circuit is typically very complicated in structure. In addition, because the low/reverse brake is locked due to the operation of the manual valve, it is difficult to provide timely locking of the low/reverse brake. This is not good enough for the prevention of shift shock.

SUMMARY OF THE INVENTION

It is an object of the present invention to provide an automatic transmission control system which does not cause any locking of the transmission gear mechanism.

It is another object of the present invention to provide an automatic transmission control system having a hydraulic control circuit which is simple in structure and can provide timely locking of the low/reverse brake.

The foregoing objects of the present invention are accomplished by providing an automatic transmission control system including a plurality of frictional coupling elements, provided within an automatic transmission, which are selectively locked and unlocked to place the automatic transmission into any desired gear in various ranges, such as a drive range, a low speed range and a reverse range. These frictional coupling elements include a low/reverse brake for providing the low speed range and the reverse range and a specific frictional coupling element, such as a 3/4 clutch, which potentially causes mechanical locking of the automatic transmission when it is locked simultaneously with locking of the low/reverse frictional coupling element. The automatic transmission control system comprises a first valve for connecting and disconnecting a supply of hydraulic pressure to the low/reverse frictional coupling element through a hydraulic pressure line so as to lock and unlock the low/reverse frictional coupling element in the low speed range and in the reverse range, and a second valve for connecting and disconnecting a supply of hydraulic pressure to the specific frictional coupling element to lock and unlock the specific frictional coupling element. The first and second valves are disposed in series between a hydraulic pressure source and the low/reverse frictional coupling element and cooperate with each other so as to connect a supply of hydraulic pressure alternatively to the low/reverse frictional coupling element and the specific frictional coupling element.

The automatic transmission control system may further include a reducing valve, disposed downstream from the first valve, having a drain port which is brought into communication with the hydraulic pressure source in the reverse range. Otherwise, the automatic transmission control system may further comprise a reducing valve disposed between the first valve and the second valve and a shuttle valve disposed between the first valve and the reducing valve.

With the automatic transmission of the present invention, only when the specific frictional coupling element, which potentially brings the transmission mechanism into internal locking, is unlocked does the first valve permit hydraulic pressure to be supplied to the low/reverse frictional coupling element at an appropriate timing, certified allowing the low/reverse frictional coupling element to be smoothly brought into an unlocked state or into a locked state.

In such an automatic transmission control system, which includes the reducing valve disposed downstream from the first valve so as to place the drain port in communication with the hydraulic pressure source in the reverse range, because the reducing valve is not supplied with hydraulic pressure while the first valve does not supply hydraulic pressure to the low/reverse frictional coupling element, a waste of hydraulic pressure energy, due to a vain reduction of pressure caused by the reducing valve, is prevented. Hydraulic pressure supplied to the reducing valve at a drain port assures that the low/reverse frictional coupling element is supplied with hydraulic pressure during a shift of the transmission gear mechanism into the reverse range.

In the automatic transmission control system of the present invention, which includes the reducing valve disposed between the first valve and the second valve and the shuttle valve disposed between the first valve and the reducing valve, because hydraulic pressure is supplied in the reverse range to the low/reverse frictional coupling element through the shuttle valve rather than through the reducing valve, the supply of hydraulic pressure to the low/reverse frictional coupling element is assured, even if the reducing valve, in which the drain port is left opened, sticks.

BRIEF DESCRIPTION OF THE DRAWINGS

The above and other objects and features of the present invention will be clearly understood from the following description of preferred embodiments thereof when considered in conjunction with the accompanying drawings, in which:

FIG. 3 is a block diagram showing a controller for various valves of the hydraulic control circuit of FIG. 2;

FIG. 4 is a schematic illustration showing a part of a hydraulic control circuit in accordance with another preferred embodiment of the present invention for the automatic transmission shown in FIG. 1.

DETAILED DESCRIPTION OF THE PREFERRED EMBODIMENTS

Figure 1:
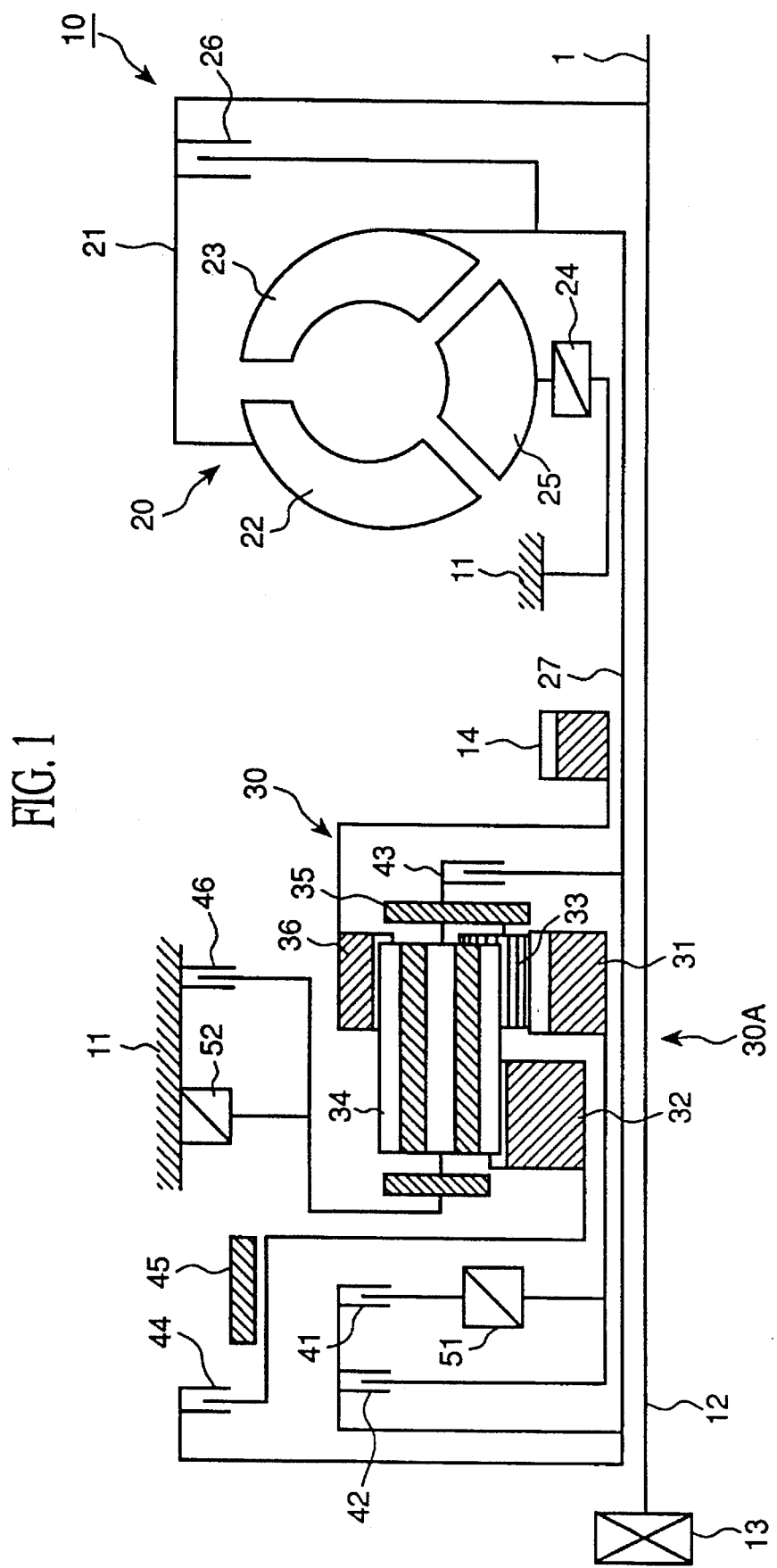
FIG. 1 is a schematic illustration of an automatic transmission with which a control system of the present invention cooperates.

Referring now to the drawings in detail, and in particular, to FIG. 1, an automatic transmission 10 equipped with a control system in accordance with a preferred embodiment of the present invention has a mechanical configuration including a torque converter 20 and a transmission gear mechanism 30. This transmission gear mechanism 30 includes various frictional coupling elements 41–46, such as clutches and brakes, and one-way clutches 51 and 52 which are selectively operated so as to provide different torque transferring paths of the transmission gear mechanism 30.

The torque converter 20, which multiplies engine torque, has driving and driven tori generally referred to as a pump 22 and a turbine 23, respectively, and a stator 25. The pump 22 is placed within and secured to a housing 21 secured to a pump shaft 12. The turbine 23, which is secured to a hollow turbine shaft 27 functioning as an input shaft of the transmission gear mechanism 30, is placed within the housing 21, so as to face the pump 22, and driven by the pump 22 by means of a special lightweight oil. The stator 25 is inserted between the pump and turbine 22 and 23 and mounted on a transmission housing 11 through a one-way clutch 24 so as to be allowed to spin in the direction of the pump 22. As is well known to those skilled in the art, the stator 25 intercepts the oil thrown off by the turbine 23 and redirects the path of this oil so as to cause the oil to enter the pump 23 smoothly, thereby performing engine output torque transmission and multiplication. The torque converter 20 further has a lock-up clutch 26 placed between the housing 21 and the turbine 23 for mechanically locking the pump 22, and, hence, the pump shaft 12, and the turbine 23 together when it is activated. An engine output shaft 1 is directly connected to, or otherwise formed integrally with, the pump shaft 12 and extends so as to pass through the hollow turbine shaft 27. The engine output shaft 21 also drives an oil pump 13 disposed at the rear end of the automatic transmission 10 opposite to the torque converter 20 with respect to the transmission gear mechanism 30. By means of this torque converter 20, engine output torque is multiplied and transmitted to the transmission gear mechanism 30.

The transmission gear mechanism 30 is comprised of a Labinyo type of planetary gear 30A, various frictional coupling elements 41–46, such as clutches and brakes, and one-way clutches 51 and 52. The planetary gear 30A comprises a small sun gear 31, a large sun gear 32 having a diameter larger than that of the small sun gear 31, a plurality of short pinion gears 33, a long pinion gear 34 longer in axial length and larger in diameter than the short pinion gear 33, a carrier 35 and a ring gear 36. These small and large sun gears 31 and 32 are loosely mounted for rotation on the turbine shaft 27 side by side and in order from the torque converter 20. The small pinion gears 33 are arranged around and in external engagement with the small sun gear 31. The long pinion gear 34 is in engagement with both short pinion gears 33 and large sun gear 32 and in external engagement with the ring gear 36. These short pinion gears 33 and long pinion gear 34 are independently supported for rotation by the carrier 35.

Various frictional coupling elements are provided, including a forward clutch (FWD) 41 and a coast clutch (CST) 42 disposed in parallel with each other between the turbine shaft 27 and the small sun gear 31, a third/fourth (3/4) clutch 43 disposed between the turbine shaft 27 and the carrier 35, a reverse clutch (RVS) 44 disposed between the turbine shaft 27 and the large sun gear 32, a second/fourth (2/4) brake 45, such as a band brake disposed between large sun gear 32 and the reverse clutch 44, for braking the large sun gear 32, and a low-speed/reverse brake (LRV) 46 disposed between the small sun gear 31 and the forward clutch 41. Further, a first one-way clutch (FOW) 51 is disposed in series with the forward clutch 41 between the small sun gear 31 and the forward clutch 41, and a second one-way clutch (SOW) 52 is disposed in parallel with the low-speed/reverse brake 46 between the carrier 35 and the transmission housing 11.

These frictional coupling elements 41–46, and one-way clutches 51 and 52 are selectively activated so as to place the transmission gear mechanism 30 into desired gears, for instance first (1st) gear to fourth (4th) gear in a drive (D) range, first (1st) gear to third (3rd) gear in a second speed (S) range and first (1st) and second (2nd) gears in a low speed (L) range, as shown in Table I.

TABLE I

|  |  | CLUTCH | | | | BRAKE | | ONE-WAY CLUTCH | |
|---|---|---|---|---|---|---|---|---|---|
| Range/Gear | | FWD | CST | 3/4 | RVS | 2/4 | LRV | FOW | SOW |
| Park (P) | | | | | | | | | |
| Reverse (R) | | | | | O | | O | | |
| Neutral (N) | | | | | | | | | |
| Drive (D) | 1st | O | | | | | | O | O |
|  | 2nd | O | | | | O | | O | |
|  | 3rd | O | O | O | | | | O | |
|  | 4th | O | | O | | O | | | |
| Second (S) | 1st | O | | | | | | O | O |
|  | 2nd | O | O | | | O | | O | |
|  | 3rd | O | O | O | | | | O | |
| Low (L) | 1st | O | O | | | | O | O | O |
|  | 2nd | O | O | | | O | | O | |

Specifically, at the 1st gear, the forward clutch 41 and the first and second one-way clutches 51 and 52 are locked, causing the transmission of output torque from the torque converter 20 to the small sun gear 31 of the planetary gear 30A through the turbine shaft 27 via the forward clutch 41 and the first one-way clutch 51. In this instance, the locked second one-way clutch 52 holds the carrier 35 of the planetary gear 30A operationally fixed with respect to the transmission housing 11, causing the planetary gear 30A to serve as a stable gear train which does not cause any differential motion for the transmission of output torque from the torque converter 20 to the ring gear 36 through the short and long pinion gears 33 and 34 via the small sun gear 31. As a result, at the 1st gear, the transmission gear mechanism 30 provides the largest reduction ratio corresponding to the ratio of diameter between the small sun gear 31 and the ring gear 36.

At the 2nd gear, the 2/4 brake 45 is applied simultaneously with unlocking of the second one-way clutch 52 while the forward clutch 41 and the first one-way clutch 51 are held locked. This disables the large sun gear 32 from rotating, so as to cause the transmission of output torque from the torque converter 20 to the long pinion gear 34 through the turbine shaft 27 via the small sun gear 31 and the short pinion gear 33. At this time, because the long pinion gear 34 remains in engagement with the large sun gear 32 disabled in rotation by the 2/4 brake 45, it rotates around the large sun gear 32 and is accompanied by the carrier 35. This causes an increase in the rotation of the ring gear 36 corresponding to rotation of the carrier 35 as compared with when the transmission gear mechanism 30 is at the 1st gear, providing the transmission gear mechanism 30 at the 2nd gear with a reduction ratio smaller than in the 1st gear.

When the transmission gear mechanism 30 is placed into the 3rd gear, simultaneously with unlocking or releasing of the 2/4 brake 45, both coast clutch 42 and 3/4 clutch 43 are locked. As a result, transmission of output torque from the torque converter 20 is connected to the carrier 35 through the 3/4 clutch 43 as well as to the small sun gear 31 through the turbine shaft 27 via the forward clutch 41 and the first one-way clutch 51. This causes the planetary gear 30A to rotate as a whole at the same rotational speed as the turbine 23 of the torque converter 20 through the turbine shaft 27.

Further, at the 4th gear, the 2/4 brake 45, having been unlocked or released for the 3rd gear, is locked again, and the transmission of output torque from the torque converter 20 is connected to the carrier 35 through the turbine shaft 27 via the 3/4 clutch 43, causing the long pinion gear 34 to rotate around the large sun gear 32 along with the carrier 35 and on its axis. As a result, the planetary gear 30A causes an increase in the rotation of the ring gear 36 by the total of the rotation of the carrier 35 on the axis of the turbine shaft 27 and the rotation of the long pinion gear 34 on its axis, placing the transmission gear mechanism 30 in the overdrive 4th gear.

In the reverse (R) range, both reverse clutch 44 and lowspeed/reverse brake 46 are locked or applied, connecting the transmission of output torque from the torque converter 20 through the turbine shaft 27 to the large sun gear 32 with the carrier 35 operationally fixed. This brings the large sun gear 32, the long pinion gear 34 and the ring gear 36 into a steady gear train, so that the transmission gear mechanism 30 in the reverse (R) range provides a reduction ratio corresponding to the ratio of diameters of the large sun gear 32 and the ring gear 36. It is apparent that the ring gear 36 rotates in the direction opposite to the direction in which the large sun gear 32, and hence the turbine shaft 27, rotates.

In this instance, because the first one-way clutch 51, which connects the transmission of output torque from the torque converter 20 through the turbine shaft 27 at the 1st, 2nd or 3rd gear, and the second one-way clutch 52, which receives reaction force at the 1st gear, are unlocked during coasting, engine braking is not available in these gears. However, engine braking is applied by locking the coast clutch 42 in parallel with the first one-way clutch 51 at the 3rd gear in the drive (D) range, the 2nd and 3rd gears in the second speed (S) range, and the 1st and 2nd gears in the low speed (L) range, and by locking the low/reverse brake 46 in parallel with the second one-way clutch 52 at the 1st gear in the low speed (L) range.

These frictional coupling elements 41–46, are activated by means of hydraulically controlled actuators (referred to as actuators for simplicity) which are selectively operated by a hydraulic control circuit 60.

Figure 2A:
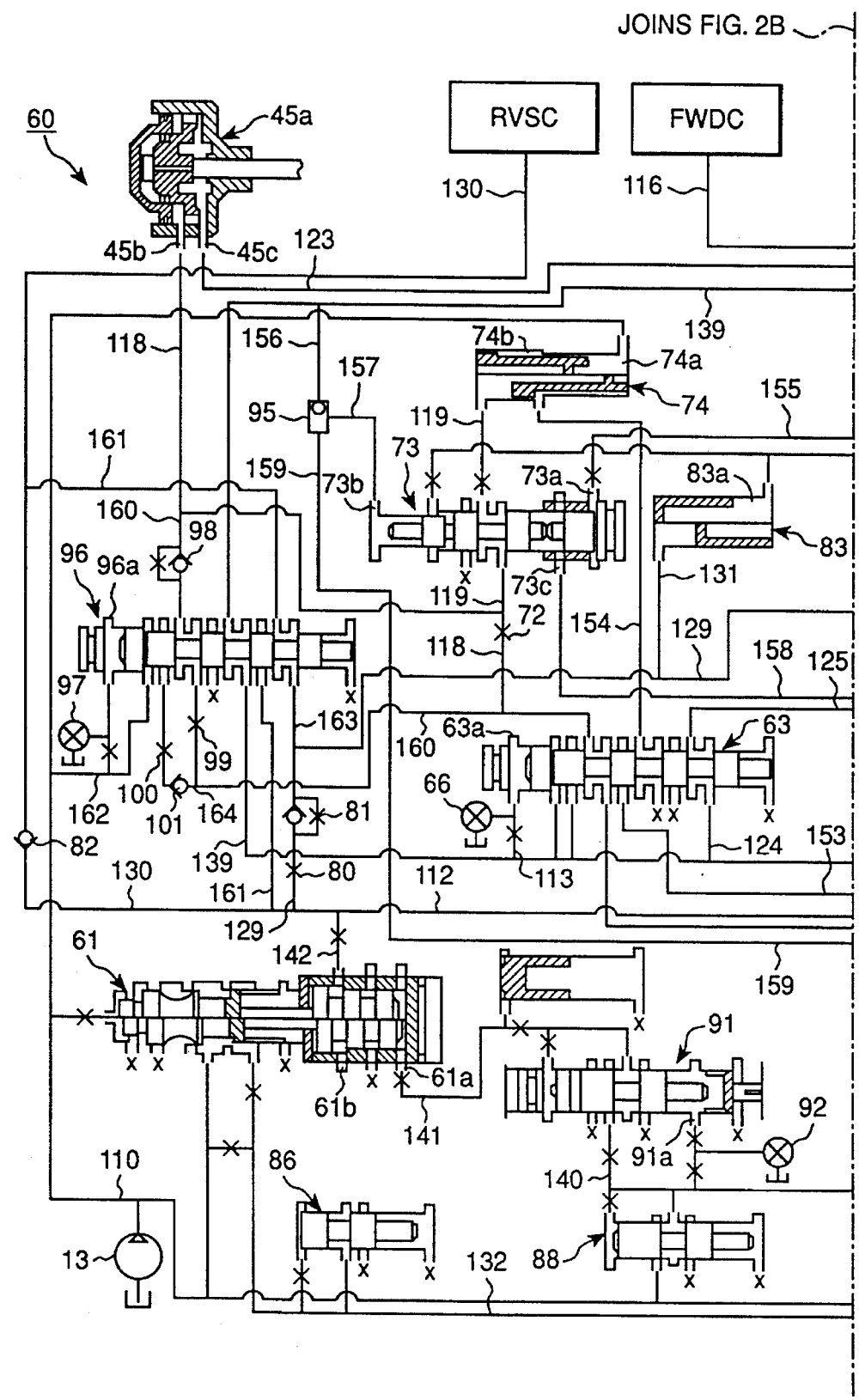
FIG. 2 is a diagram showing a hydraulic control circuit in accordance with a preferred embodiment of the present invention for the automatic transmission shown in FIG. 1.
Figure 2B:
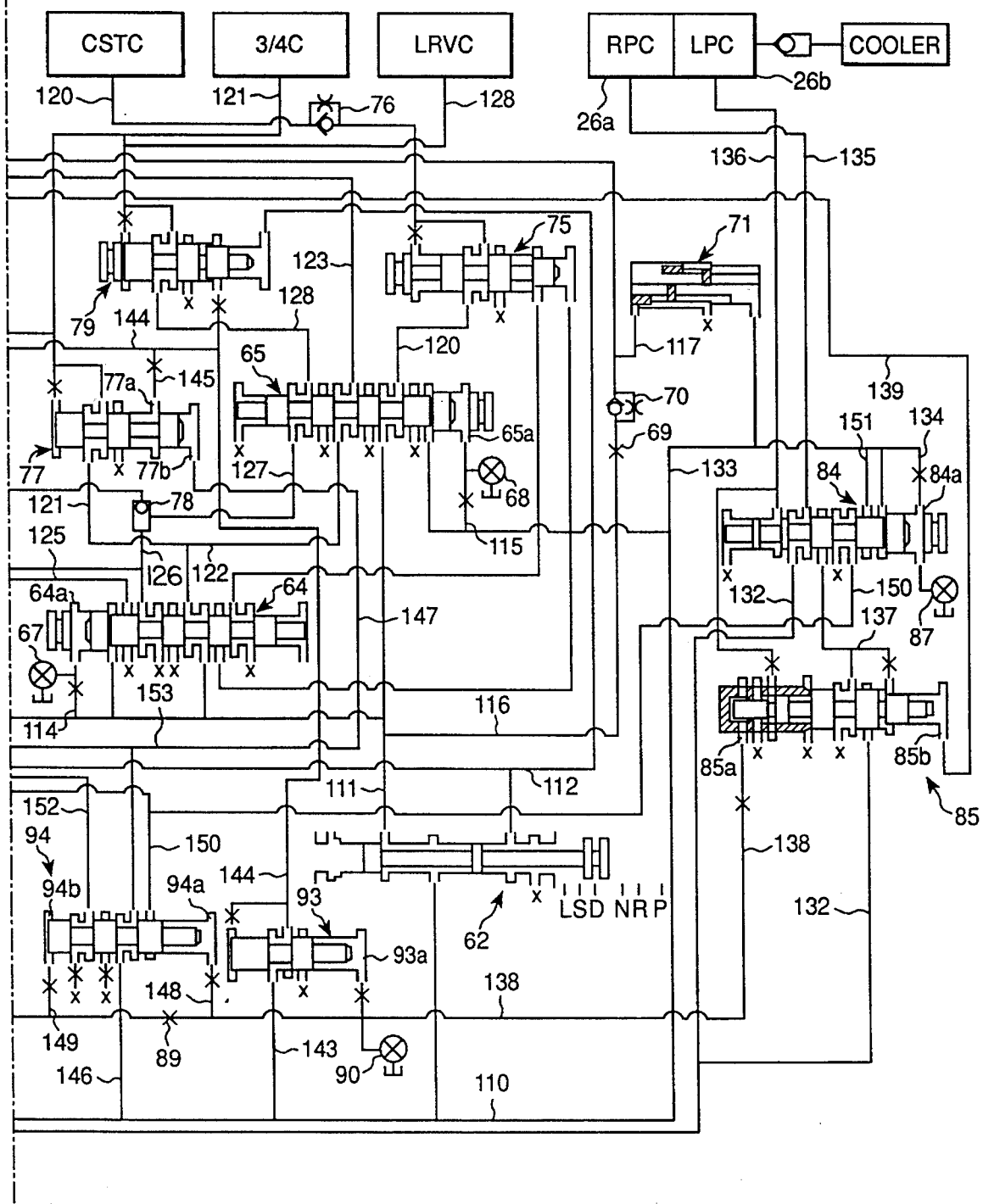

Referring to FIG. 2, the hydraulic control circuit 60, which cooperates with the automatic transmission 10, includes various actuators. One of the actuators, namely, a 2/4 brake actuator 45a for the 2/4 brake 45, comprises a servo valve having a brake apply pressure port (which is referred to as a brake apply port for simplicity) 45b and a brake release pressure port (which is referred to as a brake release port for simplicity) 45c, which may be any type well known to those skilled in the art. This type of servo valve actuator 45a operates such that it activates the 2/4 brake 45 so that it locks for brake application under the application of hydraulic pressure to the brake apply port 45b only and unlocks for brake release when both brake apply and brake release ports 45b and 45c are supplied with hydraulic pressure and when neither the brake apply port 45b nor the brake release port 45c is supplied with any hydraulic pressure. Each of the actuators, other than the 2–4 brake servo valve actuator 45a, comprises an ordinary hydraulically controlled piston which may take any type well known to those skilled in the art. The hydraulic control circuit 60 further includes various valves, such as a regulator valve 61 for regulating pressure of a working oil discharged into a main pressure line 110 from the oil pump 13 to a certain level of line pressure, a manual valve 62 which is manually operated to selectively place the automatic transmission 10 into any desired range, and first, second and third shift valves 63, 64 and 65 for selectively activating the frictional coupling elements 41–46 according to gear shifts to possible gears.

The manual valve 62 is manually operated to select three forward ranges, namely the drive (D) range, the second speed (S) range and the low speed (L) range. It further selects the reverse (R) range, the neutral (N) range and the park (P) range. The manual valve 62 is configured such that it brings the main pressure line 110 into communication with a forward pressure line 111 when selecting any one of the forward ranges and with a reverse pressure line 112 when selecting the reverse (R) range.

The first shift valve 63 is provided at its one end with a control pressure port 63a which is in communication with the forward pressure line 111 through a first control pressure line 113. Similarly, the second and third shift valves 64 and 65 are provided at their first ends with control pressure ports 64a and 65a, respectively, which are in communication with the forward pressure line 111 through a second control pressure line 114 and a third control pressure line 115, respectively. These first to third control pressure lines 113 to 115 are provided with first to third solenoid valves (SLDVs) 66, 67 and 68, respectively. The first solenoid valve 66 operates such that it drains a control pressure from the first shift valve 63 at the control pressure port 63a when energized or turned ON so as to displace its spool to the one end in the left hand side position (which is referred to as a left end position) as viewed in FIG. 2 and introduces a control pressure into the first shift valve 63 at the control pressure port 63a through the first control pressure line 113 when deenergized or turned OFF so as to displace the spool to another end in the right hand side position (which is referred to as a right end position) as viewed in FIG. 2 against a spring (not shown). Similarly, the second solenoid valve 67 operates such that it drains a control pressure from the second shift valve 64 at the control pressure port 64a when energized or turned ON so as to displace its spool in the left end position and introduces a control pressure into the second shift valve 64 at the control pressure port 64a through the second control pressure line 114 when deenergized or turned OFF so as to displace the spool in the right end position against a spring (not shown). On the other hand, the third solenoid valve 68 operates such that it drains a control pressure from the third shift valve 65 at the control pressure port 65a when energized or turned ON so as to displace its spool in the right end position and introduces a control pressure into the third shift valve 65 at the control pressure port 65a through the third control pressure line 115 when deenergized or turned OFF so as to displace the spool in the left end position against a spring (not shown). These first to third solenoid valves (SLDVs) 66 to 68 are energized and deenergized or turned ON and OFF by a controller (which will be described in detail later) in various operative patterns predetermined according to vehicle speeds and engine throttle openings so as to selectively activate the frictional coupling elements 41 to 46 as shown in Table I for shifting the automatic transmission 10 into the 1st to 4th gears. The operative patterns of the solenoid valves are shown in Table II.

TABLE II

| | Range | | | | | | | | |
|---|---|---|---|---|---|---|---|---|---|
| | D Range | | | | S Range | | | L range | |
| Gear | 1st | 2nd | 3rd | 4th | 1st | 2nd | 3rd | 1st | 2nd |
| 1st SLDV | OFF | ON | ON | ON | OFF | ON | ON | OFF | ON |
| 2nd SLDV | ON | ON | OFF | OFF | ON | ON | OFF | ON | ON |
| 3rd SLDV | ON | ON | OFF | ON | ON | OFF | OFF | OFF | OFF |

A forward clutch pressure line 116 branches off from the forward pressure line 111 which is brought into communication with the main pressure line 110 when the manual valve 62 is operated so as to select any one of the forward ranges, namely the drive (D) range, the second speed (S) range and the low speed (L) range, and leads to the forward clutch 41 via a bi-directional or two-way orifice 69 and a one-way orifice 70. Through the forward clutch pressure line 116, the forward clutch 41 is always applied with locking pressure in each of the drive (D) range, the second speed (S) range and the low speed (L) range. In this instance, the forward clutch pressure line 116 is connected to a neutral/drive (N/D) accumulator 71 downstream from the one-way orifice 70 through a pressure line 117.

The forward pressure line 111, leading to the first shift valve 63, is brought into communication with a brake apply pressure line 118 when the first shift valve 63 is forced to displace its spool into the left end position resulting from energization of the first solenoid valve 66, so as to introduce hydraulic pressure into the 2/4 brake servo valve actuator 45a at the brake apply port 45b via a two-way orifice 72. Consequently, when the first solenoid valve 66 is energized or turned ON in the forward ranges, in other words, when hydraulic pressure is introduced into the 2/4 brake servo valve actuator 45a only at the brake apply port 45b at the 2nd, 3rd or 4th gear in the drive (D) range, at the 2nd or 3rd gear in the second speed (S) range, and at the 2nd gear in the low speed (L) range, the 2/4 brake 45 is applied. The brake apply pressure line 118 is connected to a first/second (1/2) accumulator 74 through a pressure line 119 having an accumulation cut valve 73. The forward pressure line 111 also leads to the third shift valve 65 and is brought into communication with a coast clutch pressure line 120 when the third shift valve 65 is forced to displace its spool into the left end position resulting from deenergization of the third solenoid valve 68. This coast clutch pressure line 120 leads to the coast clutch 42 via a reducing valve 75 and a one-way orifice 76. Consequently, when the third solenoid valve 68 is deenergized or turned OFF in the forward ranges, in other words, at the 3rd gear in the drive (D) range, at the 2nd gear or the 3rd gear in the second speed (S) range, and the 1st gear or 2nd gear in the low speed (L) range, the coast clutch 42 is locked.

The forward pressure line 111 further leads to the second shift valve 64 and is brought into communication with a 3/4 clutch pressure line 121 leading to the 3/4 clutch 43 via a control valve 77 when the second shift valve 64 is forced to displace its spool into the right end position resulting from deenergization of the second solenoid valve 67. By means of this 3/4 clutch pressure line 121, when second solenoid valve 67 is deenergized or turned OFF in the forward ranges, in other words, at the 3rd or 4th gear in the drive (D) range and at the 3rd gear in the second speed (S) range, the 3/4 clutch 43 is locked. In this instance, a pressure line 122 branching off from the 3/4 clutch pressure line 121 leads to the third shift valve 65 and is brought into communication with a brake release pressure line 123, leading to the brake release port 45c of the servo valve actuator 45a when the third shift valve 65 is forced to displace its spool into the left end position, resulting from energization of the third solenoid valve 68. Consequently, when both second and third solenoid valves 67 and 68 are deenergized or turned OFF in the forward ranges, in other words, at the 3rd gear in the drive (D) range and in the second speed (S) range, release pressure is introduced into the servo valve actuator 45a at the brake release port 45c, releasing the 2/4 brake 45.

A pressure line 124, branching off from the forward pressure line 111 and leading to the first shift valve 63, is brought in communication with a pressure line 125 leading to the second shift valve 64 when the first shift valve 63 is forced to displace its spool into the right end position resulting from deenergization of the first solenoid valve 66. On the other hand, a pressure line 126, which is connected to the second shift valve 64 and brought into communication with the pressure line 125 when the second shift valve 64 is forced to displace its spool into the left end position resulting from energization of the second solenoid valve 67, leads to the third solenoid valve 68 through a pressure line 127 via a shuttle valve 78. This pressure line 127 is brought into communication with a low/reverse brake pressure line 128 connected to the low-speed/reverse brake 46 through a reducing valve 79 when the third shift valve 65 is forced to displace its spool into the left end position resulting from deenergization of the third solenoid valve 68. In other words, the first to third solenoid valves 66 to 68 are deenergized, energized and deenergized or turned Off, On and Off, respectively, in the forward ranges, in other words at the 1st gear in the low speed (L) range, to operate the low-speed/ reverse brake 46 appropriately.

The reverse pressure line 112, which is in communication with the main pressure line 110 in the reverse (R) range, leads to the third shift valve 65 through a pressure line 129 branching off from the reverse pressure line 112 and provided with a two-way orifice 80 and a one-way orifice 81 and then the pressure line 127 connected to the pressure line 129 via the shuttle valve 78. This reverse pressure line 112 is brought into communication with the low/reverse brake pressure line 128 when the third shift valve 65 is forced to displace its spool into the left end position resulting from deenergization of the third solenoid valve 68. This reverse pressure line 112 also leads to the reverse clutch 44 through a reverse clutch pressure line 130 connected to the reverse pressure line 112 through a check valve 82. Accordingly, in the drive (D) range, the reverse clutch 44 is held locked, while the low-speed/reverse brake 46 is applied when the third solenoid valve 68 is deenergized or turned OFF. The pressure line 129 is connected to a neutral/reverse (N/R) accumulator 83 through a pressure line 131 branching off from the pressure line 129 between the one-way orifice 81 and the shuttle valve 78.

The hydraulic control circuit 60 further includes a torque converter shift valve or fourth shift valve 84 and a lock-up control valve 85 for activating the lock-up clutch 26 of the torque converter 20. A converter shift pressure line 132 extending from the regulator valve 61 and provided with a relief valve 86 is connected to both fourth shift valve 84 and lock-up control valve 85. Further, a pressure line 134, which extends from a pressure line 133 branching off from the main pressure line 110, is connected to the fourth shift valve 84 at its control pressure port 84a where a fourth solenoid valve 87 is connected. The fourth shift valve 84 is forced to place its spool into the left end position when the fourth solenoid valve 87 is deenergized or turned OFF so as to bring the converter shift pressure line 132 into communication with a release pressure line 135 leading to a release pressure chamber (RPC) 26a of the torque converter 20. When the release pressure chamber (RPC) 26a is supplied with working oil as a control pressure, the lock-up clutch 26 is unlocked so as to release the torque converter 10 and enable it to allow slippage. On the other hand, when the fourth solenoid valve 87 is energized or turned ON and drains the working oil from the fourth shift valve 84 through the control pressure port 84a, the fourth shift valve 84 allows the spool to move into the left end position, bringing the converter shift pressure line 132 into communication with a lock-up release pressure line 136 leading to a lock-up pressure chamber (LPC) 26b of the torque converter 20. When the lock-up pressure chamber (LPC) 26b is supplied with working oil as a control pressure, the lock-up clutch 26 is locked so as to mechanically lock the pump and turbine 22 and 23 of the torque converter 10 together. At this time, the release pressure line 135 is brought into communication with a connecting pressure line 137 leading to the lock-up control valve 85 through the fourth shift valve 84, applying working oil regulated in pressure level by the lock-up control valve 85 as a release pressure to the release pressure chamber (RPC) 26a of the lock-up clutch 26.

In other words, the lock-up control valve 85 is connected at the control pressure port 85a provided at one end thereof to a control pressure line 138 leading from the main pressure line 110 via a reducing valve 88 and at a regulation-interruption pressure port 85b provided at another end thereof to a regulation-interruption pressure line 139 leading to the forward pressure line 111. A first duty solenoid valve 90 provided in the control pressure line 138 downstream from a two-way orifice 89 as viewed from the reducing valve 88 regulates the control pressure to be supplied to the lock-up control valve 85 at the control pressure port 85a according to duty rates at which it periodically opens and closes. On condition of no supply of line pressure to the lock-up control valve 85 at the regulation-interruption pressure port 85b through the regulation-interruption pressure line 139, the first duty solenoid valve 90 regulates the difference between a lock-up pressure supplied into the lock-up pressure chamber (LPC) 26b of the lock-up clutch 26 through the converter shift pressure line 132 and the lock-up pressure line 136 and a release pressure supplied into the release pressure chamber (RPC) 26a of the lock-up clutch 26 through the release pressure line 135 and the connecting pressure line 137, placing the lock-up clutch 26 so that it allows slippage. On the other hand, when a line pressure is supplied to the lock-up control valve 85 at the regulation-interruption pressure port 85b through the regulation-interruption pressure line 139, the lock-up control valve 85 holds its spool displaced in the left end position, so as to drain the working oil in the release pressure chamber (RPC) 26a of the torque converter 20 through the release pressure line 135 and the connecting pressure line 137 via the fourth shift valve 84, thereby completely locking the lock-up clutch 26. In this instance, the lock-up control valve 85 is provided with an orifice (not shown) at the drain port designed and adapted to prevent the working oil from being drained in excess even when the working oil flows into the release pressure chamber (RPC) 26b from the lock-up pressure chamber (LPC) 26a through the lock-up pressure line 136. The first duty solenoid valve 90 is designed and adapted to provide a decrease in pressure level with an increase in duty rate D1. Specifically, when the first duty solenoid valve 90 operates at a duty rate D1 of 100%, the lock-up control valve 85 functions with its drain port always opened, decreasing the pressure level in the converter shift pressure line 132 downstream from the two-way orifice 89 to the level of zero (0). When the first duty solenoid valve 90 operates at a duty rate D1 of 0%, however, the lock-up control valve 85 functions with its drain port always closed, holding the pressure in the converter shift pressure line 132 downstream from the two-way orifice 89 at the highest level.

The hydraulic control circuit 60 also includes a pressure modulation valve 91 for controlling the line pressure regulated by the regulator valve 61 and a second duty solenoid valve 92 for causing the modulation valve 91 to perform pressure modulation. This pressure modulation valve 91 is connected to a pressure line 140 leading to the main pressure line 110 through the reducing valve 88. A control pressure regulated by the second duty solenoid valve 92 periodically opening and closing at duty rates D2 is introduced into the modulation valve 91 at its control pressure port 91a so as to cause the modulation valve 91 to produce a modulated pressure according to the duty rates D2. In this instance, the duty rate D2 is established according, for instance, to engine throttle openings. This modulated control pressure corresponding to an engine throttle opening is introduced into the regulator valve 61 at its first pressure increase port 61a through a pressure line 141, causing the regulator valve 61 to increase the line pressure according to an increase in throttle opening. On the other hand, the regulator valve 61 is connected at its second pressure increase port 61b to a pressure line 142 branching off from the reverse pressure line 112 so as to increase the line pressure so that it is higher in the reverse (R) range. The control pressure, which is regulated as lock-up pressure for the lock-up clutch 26 by the first duty solenoid valve 90, is also introduced into a modulation valve 93 at its control pressure port 93a. This modulation valve 93 modulates the line pressure introduced therein through a pressure line 143 branching off from the main pressure line 110 according to the control pressure regulated by the first duty solenoid valve 90 and supplies the modulated control pressure into a back pressure chamber of the N/R accumulator 83 through a pressure line 144.

The control valve 77 provided in the 3/4 clutch pressure line 121 is connected at its control pressure port 77a to a pressure line 145, branching off from the pressure line 144, so that activation of the first duty solenoid valve 90 at a duty rate D1 causes the modulation valve 93 to produce a modulated pressure according to the duty rate D1 and supply it into the control valve 77. Accordingly, the control valve 77 produces a locking pressure for the 3/4 clutch according to the duty rate D1. On the other hand, the control valve 77 is connected at its regulation-interruption pressure port 77b to a regulation-interruption pressure line 147 leading to the main pressure line 110 through a pressure line 146 via a switch valve 94. When the switch valve 94 communicates the regulation-interruption pressure line 147 with the pressure line 146, the line pressure is introduced into the control valve 77 at the regulation-interruption pressure port 77b from the main pressure line 110 and interrupts the regulative operation of the control valve 77. More specifically, the switch valve 94 is connected at its control pressure port 94a at its one end to a pressure line 148 branching off from the control pressure line 138 between the two-way orifice 89 and the first duty solenoid valve 90 and at a balancing pressure port 94b at another end thereof to a pressure line 149 branching off from the control pressure line 138 upstream from the two-way orifice 89. The switch valve 94 forces its spool to the left end position when the control pressure produced by the first duty solenoid valve 90 is above a predetermined level and brings the regulation-interruption pressure line 147 into communication with the main pressure line 110 through the pressure line 146. As a result, the line pressure is introduced into the control valve 77 at the regulation-interruption pressure port 77b, from the main pressure line 110, so as to interrupt the regulative operation of the control valve 77. On the other hand, when the control pressure produced by the first duty solenoid valve 90 drops below the predetermined level, the switch valve 94 forces its spool in the left end position, so as to disconnect the communication between the regulation-interruption pressure line 147 and the pressure line 146.

The switch valve 94 is further connected to a pressure line 150 leading to the fourth shift valve 84. This pressure line 150 is brought into communication with the regulation-interruption pressure line 147 when the switch valve 94 forces the spool in the right end position and also with a pressure line 151 leading to the main pressure line 110 through the pressure line 133 when the fourth shift valve 84 forces the spool in the left end position. In other words, when the locking pressure of the lock-up clutch 26 is controllable during energization or turning ON of the fourth solenoid valve 87, the line pressure is introduced into the regulation-interruption pressure line 147 through the pressure line 133, and the pressure lines 151 and 150 via the fourth shift valve 84. When the fourth shift valve 84 forces the spool in the left end position for controlling of the lock-up clutch 26 to cause the torque converter 20 to allow some slippage, it brings the pressure line 150 into communication with a drain port thereof. The switch valve 94 is further connected to a pressure line 152 which is brought into communication with the brake apply pressure line 118 when the first shift valve 63 forces the spool in the right end position, or otherwise which is brought into communication selectively with drain ports (not shown). One of these drain ports, for instance, that disposed on the right side as viewed in FIG. 2, drains hydraulic pressure at a rate higher than the other. The first shift valve 63 is connected to a pressure line 153 branching off from the regulation-interruption pressure line 147 and when it forces its spool in the left end position it brings the pressure line 153 into communication with a pressure line 154 leading to a second back pressure chamber 74b of the 1/2 accumulator 74 whose first back pressure chamber 74a is always supplied with the line pressure from the main pressure line 110. Accordingly, while the line pressure is supplied with the regulation-interruption pressure line 147, it is also supplied into the second back pressure chamber 74b of the 1/2 accumulator 74 through the pressure lines 153 and 154 only when the first shift valve 63 holds the spool in the left end position.

The accumulation cut valve 73 is connected at its control pressure port 73a provided at its one end to a pressure line 155 branching off from the 3/4 clutch pressure line 121 downstream from the control valve 77 and at its accumulation cut interruption pressure port 73b provided at another end to a pressure line 157 leading to the regulation-interruption pressure line 139 of the lock-up control valve 85 through a pressure line 156 via a shuttle valve 95. The accumulation cut valve 73 is further connected at its intermediate port 73c provided at its middle to a pressure line 158 branching off from the pressure line 126 leading to the second shift valve 64. The shuttle valve 95 is disposed between the pressure line 156 and a pressure line 159 branching off from the pressure line 150 leading between the switch valve 94 and the fourth shift valve 84.

The hydraulic control circuit 60 further includes a fifth shift valve 96 for controlling gear shift timing. This fifth shift valve 96 is connected to a first bypass pressure line 160 bypassing the two-way orifice 72 disposed in the brake apply pressure line 118, a second bypass pressure line 161 bypassing the check valve 82 disposed in the reverse clutch pressure line 130, a control pressure line 162 branching off from the main pressure line 110, and the regulation-interruption pressure line 139 leading to the lock-up control valve 85. With energization and deenergization or turning ON and OFF of a fifth solenoid valve 97 connected to the control pressure line 162, the fifth shift valve 96 displaces its spool between the left and right end positions so as to open and close selectively the first and second bypass pressure lines 160 and 161 and the regulation-interruption pressure line 139.

Specifically, when the fifth solenoid valve 97 is deenergized or turned OFF, the fifth shift valve 96 forces the spool in the right end position so as, on one hand, to open both first bypass pressure line 160 and regulation-interruption pressure line 139 and, on the other hand, to close the second bypass pressure line 161. In this state, the second bypass pressure line 161 is brought into communication with the pressure line 163, provided with a two-way orifice 80 and a one-way orifice 81, branching off from the pressure line 129 and hence with both reverse clutch pressure line 130 and reverse pressure line 112. On the other hand, when the fifth solenoid valve 97 is energized or turned ON, the fifth shift valve 96 forces the spool in the left end position so as, on one hand, to close both first bypass pressure line 160 and regulation-interruption pressure line 139 and, on the other hand, to open the second bypass pressure line 161. The first bypass pressure line 160 includes a one-way orifice 98 provided downstream from the fifth shift valve 96 which is effective in restricting a working oil flowing toward the servo valve actuator 45a and a two-way orifice 99 provided upstream from the fifth shift valve 96. A pressure line 163, which branches off from the first bypass pressure line 160 downstream from the two-way orifice 99, is provided with a two-way orifice 100 which restricts a working oil flow at a rate smaller than the two-way orifice 99 and a one-way valve 101 for interrupting a working oil flow toward the fifth shift valve 96. The pressure line 163 is brought into communication with the first bypass pressure line 160 when the fifth solenoid valve 97 is energized or turned ON so as to displace the spool into the left end position.

These first to third solenoid valves 66–68, 87 and 97, and first and second duty solenoid valves 90 and 92 are operated by means of a controller 200 shown in FIG. 3.

Referring to FIG. 3, the controller 200 receives various signals, such as a signal from a speed sensor 201 representative of a vehicle speed, a signal from a throttle opening sensor 202 representative of an opening of an engine throttle, a signal from a position sensor 203 representative of a selected range position, a signal from a speed sensor 204 representative of an engine speed, a signal from a speed sensor 205 representative of a turbine speed, and a signal from a temperature sensor 206 representative of a temperature of the working oil in the hydraulic control circuit 60. These sensors 201–206 are well known in the art and may be of any known type. According to these signals, indicating driving conditions and driver's demands, the controller 200 controls the solenoid valves 66–68, 87, 90, 92 and 97.

Because the pressure line 125 leading to the second shift valve 64 is arranged so as to be brought into communication with the pressure line 124 branching off from the forward pressure line 111 through the first shift valve 63 and further with the pressure line 127 leading to the third shift valve 65 through the second shift valve 64 via the shuttle valve 78, the hydraulic pressure is directed to the low/reverse brake 46 from the pressure line 124 only when the first and second shift valves 63 and 64 are switched over so as to drain hydraulic pressure from both the 3/4 clutch 43 and brake apply port 45b of the servo valve actuator 45a. Consequently, the low/reverse brake 64 is prevented from being locked simultaneously with the 3/4 clutch 43 or the 2/4 brake 45, so as to avoid the occurrence of mechanical locking of the transmission gear mechanism 30. Further, by means of appropriately controlling the third solenoid valve 68 to turn ON and OFF so as to place the spool between its right and left end positions, the low/reverse brake 64 is locked at an appropriate timing. Specifically, only when the second solenoid valve 67 turns ON, causing the second shift valve 64 to place the spool in the left end position, while the first solenoid valve 66 turns OFF, causing the first shift valve 63 to place the spool in the right end position, is the pressure line 125 brought into communication with the pressure line 126. As apparent in Tables I and II, this status is acquired only at the 1st gear in the drive (D) range, in the second speed (S) range or in the low speed (L) range. At the 1st gear in these ranges, both 3/4 clutch 43 and 2/4 brake 45 have been unlocked. Consequently, turning the third solenoid valve 68 OFF at an appropriate timing causes the third shift valve 65 to place the spool in the left end position, bringing the pressure line 127 into communication with the low/reverse brake pressure line 128 through the third shift valve 65 and the reducing valve 79, so as to lock the low/reverse brake 46 at a timing suitable for avoiding shift shocks. In this instance, in the event of an operational fault of any one of the solenoid valves 66–68 which causes the 3/4 clutch 43 or the 2/4 brake 45 to be left locked, the low/reverse brake 46 is prevented from becoming locked, so as to prevent the occurrence of a mechanical lock of the transmission gear mechanism.

In addition, because the timing of operation of the low/reverse brake 46 is controlled by the third solenoid valve 68 which activates the third shift valve 65, the hydraulic control circuit, including the manual valve 62, is simplified in structure as compared with the prior art hydraulic control circuits in which the low/reverse brake is controlled in operation according to operation of the manual valve. Furthermore, because the low/reverse brake 46 is controlled in operation not by the use of any special actuator but the use of the third shift valve and third solenoid valve 68 essential to providing of the 3rd gear, the hydraulic control circuit is simplified in structure as compared with the prior art hydraulic control circuits. It is, of course, clear that a special actuator, such as a shift valve, may be incorporated in the hydraulic control circuit for locking and unlocking of the low/reverse brake 46.

In the configuration of the hydraulic control circuit in which the reducing valve 79 is disposed downstream from the third shift valve 65 and is directly connected to the low/reverse brake 46 through the low/reverse brake pressure line 128, an unnecessary reduction of pressure is not caused due to supply of the hydraulic pressure to the reducing valve 79 at any forward gears other than the 1st gear in the low speed (L) range, so as to eliminate a waste of hydraulic pressure. However, with the configuration the hydraulic control circuit, in the event of a sticking of the reducing valve 79 with its drain port left opened, the supply of hydraulic pressure to the low/reverse brake 46 may possibly cease. In order to prevent such a stop of hydraulic pressure supply, a modification may be made in the hydraulic control circuit as shown in FIG. 4.

Referring to FIG. 4, a pressure line 165 is provided in the hydraulic control circuit such that it interconnects the pressure line 126 with the shuttle valve 78 disposed therein and the drain port 79a of the reducing valve 79 with each other and supplies a reverse pressure to the reducing valve 79 through the pressure line 165 when the automatic transmission 10 is shifted into the reverse (R) range. In this instance, there is further provided in the hydraulic control circuit a shock reduction accumulator 166 in connection with the pressure line 122 extending from the manual valve 62. The hydraulic control circuit, in which a hydraulic pressure is supplied to the low/reverse brake 46 through both third shift valve 65 and reducing valve 79 when the automatic transmission 10 is shifted into the reverse (R) range, may be easily configured so as to interrupt the activation of the third shift valve 65 in the event of accidental shifting operation of the shift lever into the reverse (R) range during forward travel of the vehicle at a speed higher than a predetermined speed. Such a configuration of the hydraulic control circuit effectively prevents the occurrence of a sudden transition of the vehicle from high speed forward driving to reverse driving.

Figure 5:
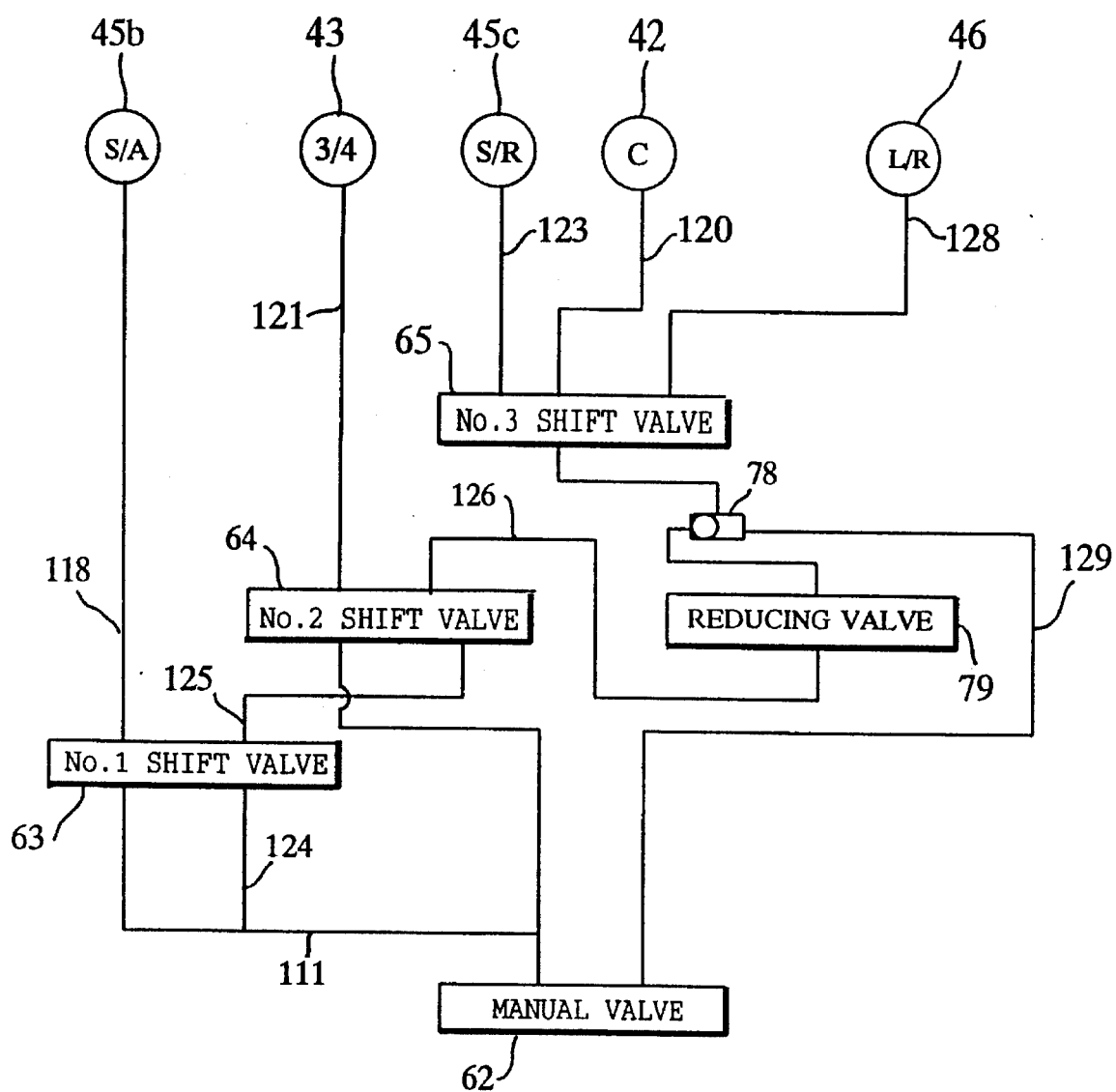
FIG. 5 is a schematic illustration showing a part of a hydraulic control circuit in accordance with still another preferred embodiment of the present invention for the automatic transmission shown in FIG. 1.

Referring to FIG. 5, the hydraulic control circuit may be further modified so as to reliably prevent the occurrence of interruption of the supply of hydraulic pressure to the low/reverse brake 46 due to the sticking of the reducing valve 79. In this modification, there is provided, in the hydraulic control circuit, a reducing valve 79 disposed between the second shift valve 64 connected downstream of the first shift valve 63 and the third shift valve 65. As was previously described, the first, second and third shift valves 63, 64 and 65 control the supply of hydraulic pressure to the 3/4 clutch 43 and 2/4 brake 45 which are directly related to the low/reverse brake 46 in connection with a mechanical lock of the transmission gear mechanism. The hydraulic control circuit is further provided with a shuttle valve 78 disposed downstream from the reducing valve 79 but upstream from the third shift valve 65. With the modified hydraulic control circuit, since the hydraulic pressure is supplied to low/reverse brake 46 not through the reducing valve 79 but through the shuttle valve 78 during reverse driving, it reliably prevents the occurrence of interruption of the supply of hydraulic pressure to the low/reverse brake 46 due to the sticking of the reducing valve 79. In this instance, the first and second shift valves 63 and 64 may be replaced in position with each other.

Although the description has been directed by way of example to an automatic transmission having a single frictional coupling element for providing a reverse gear, nevertheless, the automatic transmission may have more than one frictional coupling elements used to provide the reverse gear.

It is to be understood that, although preferred embodiments of the present invention have been described, various other embodiments and variants may occur to those skilled in the art. Such other embodiments and variants which are within the scope and spirit of the invention are intended to be covered by the following claims.

What is claimed is:

1. An automatic transmission control system including a plurality of frictional coupling elements, provided within an automatic transmission, which are selectively locked and unlocked by supplying and releasing hydraulic pressure so as to place the automatic transmission into any desired gear in various ranges, including at least a low speed range and a reverse range, said frictional coupling elements including a low/reverse frictional coupling element for providing said low speed range and said reverse range, said automatic transmission control system comprising:

a hydraulic pressure circuit for supplying hydraulic pressure to each of said frictional coupling elements from a hydraulic pressure source;

a first shift valve for connecting and disconnecting supply of said hydraulic pressure to said low/reverse frictional coupling element through said hydraulic pressure circuit so as to lock and unlock said low/reverse frictional coupling element in said low speed range and in said reverse range; and a second shift valve for connecting and disconnecting supply of said hydraulic pressure to one of said frictional coupling elements, which causes mechanical locking of said automatic transmission when said one of said frictional coupling elements is locked simultaneously with locking of said low/reverse frictional coupling element, so as to lock and unlock said one of said frictional coupling elements;

said first shift valve and said second shift valve cooperating with each other so as to connect supply of said hydraulic pressure alternatively to said low/reverse frictional coupling element and said one of said frictional coupling elements.

2. An automatic transmission control system as defined in claim 1, wherein said first and second shift valves are disposed in series between said hydraulic pressure source and said low/reverse frictional coupling element.

3. An automatic transmission control system as defined in claim 2, wherein said hydraulic pressure circuit includes at least a hydraulic pressure line leading to said low/reverse frictional coupling element from said hydraulic pressure source in which said first and second shift valves are disposed in series.

4. An automatic transmission control system as defined in claim 1, and further comprising a reducing valve downstream from said first shift valve, said reducing valve having a drain port brought into communication with said hydraulic pressure source in said reverse range.

5. An automatic transmission control system as defined in claim 1, and further comprising a reducing valve disposed between said first shift valve and said second shift valve and a shuttle valve disposed between said first shift valve and said reducing valve.

* * * * *